(12) United States Patent
Kimura

(10) Patent No.: US 8,773,073 B2
(45) Date of Patent: Jul. 8, 2014

(54) BATTERY PROTECTION CIRCUIT, BATTERY PROTECTION DEVICE, AND BATTERY PACK

(75) Inventor: Daisuke Kimura, Tokyo (JP)

(73) Assignee: Mitsumi Electric Co., Ltd., Tokyo (JP)

( * ) Notice: Subject to any disclaimer, the term of this patent is extended or adjusted under 35 U.S.C. 154(b) by 352 days.

(21) Appl. No.: 13/414,826

(22) Filed: Mar. 8, 2012

(65) Prior Publication Data

US 2012/0249087 A1 Oct. 4, 2012

(30) Foreign Application Priority Data

Apr. 4, 2011 (JP) ................................. 2011-083164

(51) Int. Cl.
*H02J 7/00* (2006.01)
(52) U.S. Cl.
USPC .......................................................... 320/134
(58) Field of Classification Search
USPC .................. 320/134, 136, 162, 164
See application file for complete search history.

(56) References Cited

U.S. PATENT DOCUMENTS

| | | | |
|---|---|---|---|
| 5,959,436 A * | 9/1999 | Takashina et al. | 320/134 |
| 6,194,875 B1 * | 2/2001 | Takimoto et al. | 320/164 |
| 7,649,343 B2 * | 1/2010 | Kamatani | 320/164 |
| 7,705,563 B2 * | 4/2010 | Ibaraki | 320/128 |
| 7,847,519 B2 * | 12/2010 | Ho | 320/134 |
| 7,928,694 B2 * | 4/2011 | Sano et al. | 320/134 |
| 2009/0278501 A1 * | 11/2009 | Ho | 320/134 |

FOREIGN PATENT DOCUMENTS

JP 10-225007 8/1998

\* cited by examiner

*Primary Examiner* — Edward Tso
*Assistant Examiner* — Ramy Ramadan
(74) *Attorney, Agent, or Firm* — IPUSA, PLLC

(57) ABSTRACT

A battery protection circuit for protecting a secondary battery composed of a first cell and a second cell, includes a reference voltage supply circuit that outputs a first reference voltage and a second reference voltage generated based on cell voltages of the first cell and the second cell, respectively; a first detection circuit that outputs a signal prohibiting charging when at least one of the cell voltages of the first cell and the second cell exceeds a predetermined overcharge indication value; a second detection circuit that outputs a signal prohibiting charging when at least one of the first reference voltage and the second reference voltage is not within a predetermined target range; and a control circuit that controls to prohibit charging when at least one of the outputs from the first detection circuit and the second detection circuit is the signal prohibiting charging.

10 Claims, 6 Drawing Sheets

BATTERY PROTECTION CIRCUIT, BATTERY PROTECTION DEVICE, AND BATTERY PACK

BACKGROUND OF THE INVENTION

1. Field of the Invention

The present invention relates to a battery protection circuit and a battery protection device protecting a secondary battery composed of plural cells, and a battery pack including the battery protection device.

2. Description of the Related Art

A power supply device including a secondary battery and having a function to prohibit charging of the secondary battery is known (for example, Patent Document 1).

FIG. 9 is a block diagram of the power supply device disclosed in Patent Document 1 (FIG. 10 of Patent Document 1). The power supply device monitors the cell voltages of secondary batteries 101 and 115 connected in a series using threshold voltages of MOS transistors 116 and 118. A logical sum generation circuit 120 is configured to switch off a P-channel MOS transistor 504 when the cell voltage of the secondary battery 101 is less than or equal to the threshold voltage of the P-channel MOS transistor 116, or when the cell voltage of the secondary battery 115 is less than or equal to the threshold voltage of the N-channel MOS transistor 118. With this, a FET-B 111 is switched off so that a charging current from a battery charger 108 to the secondary batteries 101 and 115 is shut off.

Further, a charge-discharge control circuit 102 is configured to monitor end voltages of the secondary batteries 101 and 115 and switch on an N-channel MOS transistor 505 when the end voltages satisfy an "overcharge condition". With this, similarly, the FET-B 111 is switched off so that the charging current from the battery charger 108 to the secondary batteries 101 and 115 is shut off.

[Patent Document]
[Patent Document 1] Japanese Laid-open Patent Publication No. H10-225007

However, for the circuit shown in FIG. 9, the voltage between the secondary batteries 101 and 115 is directly applied to the gates of the MOS transistors 116 and 118 so that an electrostatic resistance becomes low. Therefore, in order to improve the electrostatic resistance, it is necessary to enlarge the size of the transistors such as enlarging the gate size or the like. Further, the MOS transistor 504 and the MOS transistor 505 are necessary for appropriately shutting off the FET-B 111 to prohibit charging of the secondary batteries 101 and 115, so that the size of the device becomes larger in this point as well.

SUMMARY OF THE INVENTION

The present invention is made in light of the above problems, and provides a battery protection circuit and a battery protection device protecting a secondary battery composed of plural cells, and a battery pack including the battery protection device in which charging of the secondary battery is appropriately prohibited in an "overcharge condition" and an "over-discharge condition" with a smaller device size.

According to an embodiment, there is provided a battery protection circuit for protecting a secondary battery composed of a first cell and a second cell, including a reference voltage supply circuit that outputs a first reference voltage and a second reference voltage generated based on a cell voltage of the first cell and a cell voltage of the second cell, respectively; a first detection circuit that outputs a signal prohibiting charging when at least one of the cell voltages of the first cell and the second cell exceeds a predetermined overcharge indication value indicating an overcharge condition, and outputs a signal permitting charging when none of the cell voltages of the first cell and the second cell exceed the predetermined overcharge indication value; a second detection circuit that outputs a signal prohibiting charging when at least one of the first reference voltage and the second reference voltage is not within a predetermined target range, and outputs a signal permitting charging when all of the first reference voltage and the second reference voltage are within the predetermined target range; and a control circuit that controls a switch for allowing a flow of a charging current to the secondary battery based on the output from the first detection circuit and the second detection circuit such that charging of the secondary battery is prohibited when at least one of the outputs from the first detection circuit and the second detection circuit is the signal prohibiting charging, and charging of the secondary battery is permitted when all of the outputs from the first detection circuit and the second detection circuit are the signal permitting charging.

According to another embodiment, there is provided a battery protection device for protecting a secondary battery composed of a first cell and a second cell, including, a reference voltage supply circuit that outputs a first reference voltage and a second reference voltage generated based on a cell voltage of the first cell and a cell voltage of the second cell, respectively; a first detection circuit that outputs a signal prohibiting charging when at least one of the cell voltages of the first cell and the second cell exceeds a predetermined overcharge indication value indicating an overcharge condition, and outputs a signal permitting charging when none of the cell voltages of the first cell and the second cell exceed the predetermined overcharge indication value; a second detection circuit that outputs a signal prohibiting charging when at least one of the first reference voltage and the second reference voltage is not within a predetermined target range, and outputs a signal permitting charging when all of the first reference voltage and the second reference voltage are within the predetermined target range; a switch for allowing a flow of a charging current to the secondary battery; and a control circuit that controls the switch to shut off the flow of the charging current to the secondary battery to prohibit charging of the secondary battery when at least one of the outputs from the first detection circuit and the second detection circuit is the signal prohibiting charging, and controls the switch to allow the flow of the charging current to the secondary battery to permit charging of the secondary battery when all of the outputs from the first detection circuit and the second detection circuit are the signal permitting charging.

According to another embodiment, there is provided a battery pack including the above battery protection device and the above secondary battery.

According to the embodiment, charging of a secondary battery can be appropriately prohibited in an overcharge condition and an over-discharge condition while making the size smaller.

BRIEF DESCRIPTION OF THE DRAWINGS

Other objects, features and advantages of the present invention will become more apparent from the following detailed description when read in conjunction with the accompanying drawings.

DETAILED DESCRIPTION OF THE PREFERRED EMBODIMENTS

Figure 1:
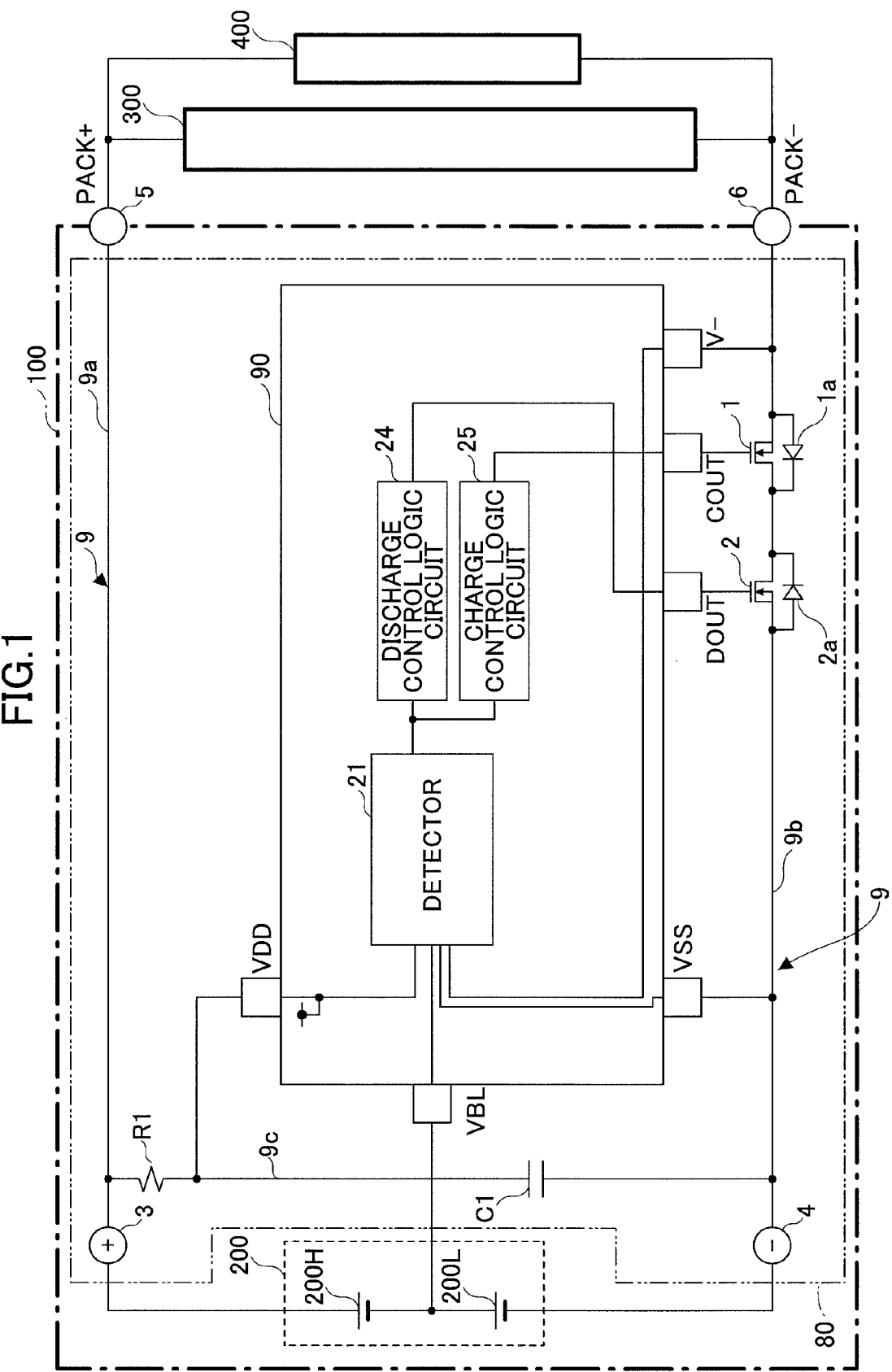
FIG. 1 is an example of a circuit diagram of a battery pack of an embodiment.

The invention will be described herein with reference to illustrative embodiments. Those skilled in the art will recognize that many alternative embodiments can be accomplished using the teachings of the present invention and that the invention is not limited to the embodiments illustrated for explanatory purposes.

It is to be noted that in the explanation of the drawings, the same components are given the same reference numerals, and explanations are not repeated.

FIG. 1 is an example of a circuit diagram of a battery pack 100 of an embodiment.

The battery pack 100 includes therein a secondary battery 200 and a protection module circuit 80. The secondary battery 200 may be, for example, a lithium ion battery, a nickel hydrogen battery or the like. In this embodiment, the secondary battery 200 is composed of two cells including a first cell 200H and a second cell 200L connected in a series.

The protection module circuit 80 is a battery protection device that protects the secondary battery 200. The protection module circuit 80 includes a charge-discharge path 9 composed of a cathode charge-discharge path 9a and an anode charge-discharge path 9b, a first field effect transistor (FET) 1, a second FET 2, a cathode terminal 3, an anode terminal 4, a cathode input-output terminal 5, an anode input-output terminal 6, a protection integrated circuit (IC) 90 (a battery protection circuit), a connecting path 9c, a resistor R1, and a capacitor C1.

The cathode terminal 3 and the cathode input-output terminal 5 are provided at both ends of the cathode charge-discharge path 9a, respectively. The anode terminal 4 and the anode input-output terminal 6 are provided at both ends of the anode charge-discharge path 9b, respectively. The first FET 1 and the second FET 2 are provided in the anode charge-discharge path 9b.

The secondary battery 200 is capable of being connected to one end of the cathode charge-discharge path 9a and the anode charge-discharge path 9b between the cathode terminal 3 and the anode terminal 4, respectively.

Further, an external load 300 is capable of being connected to the other end of the cathode charge-discharge path 9a and the anode charge-discharge path 9b between the cathode input-output terminal 5 and the anode input-output terminal 6 such that the power is supplied from the secondary battery 200 to the external load 300. The voltage at the cathode input-output terminal 5 and the anode input-output terminal 6 may be "PACK+" and "PACK−", respectively.

The battery pack 100 may be included in the external load 300 or may be attached to the external load 300 from outside. The external load 300 may be, for example, a portable electronic device or a portable electrical device. Concretely, the external load 300 may be, for example, a player for music, video or the like, a head set, a communication terminal device that includes a radio communication function such as a mobile phone or the like, an information terminal device such as a PDA, a mobile personal computer or the like, a camera, a portable video game, or the like.

A battery charger 400 is also capable of being connected to the other end of the cathode charge-discharge path 9a and the anode charge-discharge path 9b between the cathode input-output terminal 5 and the anode input-output terminal 6 such that the secondary battery 200 is charged by the battery charger 400.

The first FET 1 and the second FET 2 are connected in a series in the anode charge-discharge path 9b to switch on and off an electrical connection between the anode terminal 4 and the anode input-output terminal 6.

The first FET 1 is a first switching element that switches on and off a charging current of the secondary battery 200 flowing through the anode charge-discharge path 9b (charge-discharge path 9) in a charging direction. When the first FET 1 is switched on, the charging current flows through the charge-discharge path 9 and the secondary battery 200 is capable of being charged. When, on the other hand, when the first FET 1 is switched off, the charging current does not flow through the charge-discharge path 9 and the secondary battery 200 is prohibited from being charged.

The second FET 2 is a second switching element that switches on and off a discharging current of the secondary battery 200 flowing through the anode charge-discharge path 9b (charge-discharge path 9) in a discharging direction. When the second FET 2 is switched on, the discharging current flows through the charge-discharge path 9 and the secondary battery 200 is capable of being discharged. When, on the other hand, when the second FET 2 is switched off, the discharging current does not flow through the charge-discharge path 9 and the secondary battery 200 is prohibited from being discharged.

The first FET 1 may be, for example, a metal oxide semiconductor FET (MOSFET) including a parasitic diode 1a. In this case, the first FET 1 is provided in the anode charge-discharge path 9b such that the forward direction of the parasitic diode 1a becomes the same as the discharging direction of the secondary battery 200.

Similarly, the second FET 2 may be, for example, a MOSFET including a parasitic diode 2a. The second FET 2 is provided in the anode charge-discharge path 9b such that the forward direction of the parasitic diode 2a becomes the same as the charging direction of the secondary battery 200.

In this embodiment, the first FET 1 and the second FET 2 may be N-channel MOSFETs which are switched on when high-level signals are input to the respective gates.

Alternatively, the first FET 1 and the second FET 2 may be composed of bipolar transistors in which diodes are positioned in the directions as shown in FIG. 1 between collectors and emitters, respectively, or may be composed of other semiconductor elements such as insulated gate bipolar transistors (IGBT) or the like.

The connecting path 9c is connected to the cathode charge-discharge path 9a and the anode charge-discharge path 9b to be in parallel to the secondary battery 200. The resistor R1 and the capacitor C1 are provided in the connecting path 9c in this order from the cathode charge-discharge path 9a side.

The protection IC 90 controls the operation of the first FET 1 and the second FET 2. A power from the secondary battery 200 may be provided to the protection IC 90.

The protection IC 90 may protect the secondary battery 200 from, overcharging (overcharge protection operation), over-discharging (over-discharge protection operation), or over-current in the discharging direction or in the charging direction (over-current protection operation), for example. These protection operations are performed when predetermined conditions for the respective protection operations are satisfied.

The protection IC 90 includes a detector 21, a discharge control logic circuit 24, a charge control logic circuit 25, a VDD terminal, a VBL terminal, a VSS terminal, a DOUT terminal, a COUT terminal and a V− terminal.

The VDD terminal is connected to the connecting path 9c between the resistor R1 and the capacitor C1. The VBL terminal is connected to a point between an anode of the first cell 200H and a cathode of the second cell 200L. The VSS terminal is connected to the anode charge-discharge path 9b. The V− terminal is connected to the anode charge-discharge path 9b closer to the anode input-output terminal 6 than the first FET 1 and the second FET 2.

The COUT terminal and the DOUT terminal are respectively connected to the gates of the first FET 1 and the second FET 2.

The detector 21 is connected to the VDD terminal, the VBL terminal, the VSS terminal and the V− terminal. The discharge control logic circuit 24 and the charge control logic circuit 25 are respectively connected to the detector 21.

The charge control logic circuit 25 is connected to the COUT terminal so that the output from the charge control logic circuit 25 is input to the gate of the first FET 1. The discharge control logic circuit 24 is connected to the DOUT terminal so that the output from the discharge control logic circuit 24 is input to the gate of the second FET 2.

(Overcharge Protection Operation)

The protection IC 90, for example, switches off the first FET 1 when a predetermined condition for the overcharge protection operation of the secondary battery 200 is satisfied. With this, despite of the condition of the second FET 2, the secondary battery 200 is prevented from being overcharged.

For example, the detector 21 of the protection IC 90 detects a voltage between the VDD terminal and the VBL terminal to monitor a cell voltage of the first cell 200H of the secondary battery 200. The detector 21 of the protection IC 90 also detects a voltage between the VBL terminal and the VSS terminal to monitor a cell voltage of the second cell 200L of the secondary battery 200.

The cell voltage of the first cell 200H corresponds to a voltage at the cathode terminal 3 with respect to a voltage at the VBL terminal (in other words, a voltage of the VDD terminal with respect to the voltage at the VBL terminal). The cell voltage of the second cell 200L corresponds to the voltage at the VBL terminal with respect to a voltage at the anode terminal 4 (in other words, the voltage at the VBL terminal with respect to a voltage at the VSS terminal).

When the detector 21 of the protection IC 90 detects that the cell voltage of at least one of the first cell 200H and the second cell 200L exceeds a predetermined overcharge detection voltage (threshold voltage), the detector 21 outputs an overcharge detection signal to the charge control logic circuit 25, indicating at least one of the first cell 200H and the second cell 200L of the secondary battery 200 is detected to be overcharged.

Upon receiving the overcharge detection signal, after a predetermined delay time, the charge control logic circuit 25 outputs a signal for switching off the first FET 1 (low-level in this embodiment) from the COUT terminal to the gate of the first FET 1 to switch off the first FET 1. With this, overcharging of the first cell 200H and the second cell 200L of the secondary battery 200 can be prevented. The predetermined delay time is counted from a moment when the cell voltage that exceeds the predetermined overcharge detection voltage is detected by the detector 21.

(Over-Discharge Protection Operation)

Similarly, the protection IC 90, for example, switches off the second FET 2 when a predetermined condition for the over-discharge protection operation of the secondary battery 200 is satisfied. With this, despite of the condition of the first FET 1, the secondary battery 200 is prevented from being over-discharged.

For example, when the detector 21 of the protection IC 90 detects that the cell voltage of at least one of the first cell 200H and the second cell 200L is less than a predetermined over-discharge detection voltage (threshold voltage), the detector 21 outputs to the discharge control logic circuit 24, an over-discharge detection signal indicating at least one of the first cell 200H and the second cell 200L of the secondary battery 200 is detected to be over-discharged.

Upon receiving the over-discharge detection signal, after a predetermined delay time, the discharge control logic circuit 24 outputs a signal for switching off the second FET 2 (low-level in this embodiment) from the DOUT terminal to switch off the second FET 2. With this, over-discharging of the first cell 200H and the second cell 200L of the secondary battery 200 can be prevented. The predetermined delay time is counted from a moment when the cell voltage that is less than the predetermined over-discharge detection voltage is detected by the detector 21.

(Over-Current Protection Operation in the Charging Direction)

Further, the protection IC 90, for example, switches off the first FET 1 when a predetermined condition for the over-current protection operation of the secondary battery 200 in the charging direction is satisfied. With this, despite of the condition of the second FET 2, over-current in the charging direction of the secondary battery 200 can be prevented.

For example, the detector 21 monitors an anode side voltage "P−" between the anode input-output terminal 6 and the anode terminal 4 by detecting a voltage between the V− terminal and the VSS terminal. The anode side voltage "P−" corresponds to a voltage of the anode input-output terminal 6 with respect to the voltage of the anode terminal 4.

When the detector 21 of the protection IC 90 detects that the anode side voltage "P−" is less than or equal to a predetermined detection voltage of over-current in the charging direction (threshold voltage), the detector 21 outputs to the charge control logic circuit 25, a detection signal of over-current in the charging direction indicating an abnormal current is flowing through the anode input-output terminal 6.

Upon receiving the detection signal of over-current in the charging direction, after a predetermined delay time, the charge control logic circuit 25 outputs a signal for switching off the first FET 1 (low-level in this embodiment) from the COUT terminal to switch off the first FET 1. With this, the operational mode of the protection IC 90 moves to an abnormal current protection mode that prevents an abnormal current to flow through the charge-discharge path 9 by switching off the first FET 1. Therefore, over-current in the charging direction on the secondary battery 200 can be prevented. The predetermined delay time is counted from a moment when the anode side voltage "P−" which is less than or equal to the predetermined detection voltage of over-current in the charging direction is detected by the detector 21.

The anode side voltage "P−" is lowered when the first FET 1 is switched on because of a voltage drop by the ON resistance of the first FET 1 while the charging current for charging the secondary battery 200 is flowing through the first FET 1. Further, when the second FET 2 is also switched on, the anode side voltage "P−" is further lowered because of a voltage drop by the ON resistance of the second FET 2, while when the second FET 2 is switched off, the anode side voltage "P−" is further lowered because of a voltage drop by the parasitic diode 2a of the second FET 2.

(Over-Current Protection Operation in the Over-Charging Direction)

Similarly, the protection IC 90, for example, switches off the second FET 2 when a predetermined condition for the over-current protection operation of the secondary battery 200 in the discharging direction is satisfied. With this, despite of the condition of the first FET 1, over-current in the discharging direction of the secondary battery 200 can be prevented.

For example, when the detector 21 detects that the anode side voltage "P−" is greater than or equal to a predetermined detection voltage of over-current in the discharging direction (threshold voltage), the detector 21 outputs to the discharge control logic circuit 24, a detection signal of over-current in the discharging direction indicating an abnormal current is flowing through the anode input-output terminal 6.

Upon receiving the detection signal of over-current in the discharging direction, after a predetermined delay time, the discharge control logic circuit 24 outputs a signal for switching off the first FET 2 (low-level in this embodiment) from the DOUT terminal to switch off the second FET 2. With this, the operational mode of the protection IC 90 moves to an abnormal current protection mode that prevents an abnormal current to flow through the charge-discharge path 9 by switching off the second FET 2. Therefore, over-current in the discharging direction on the secondary battery 200 can be prevented. The predetermined delay time is counted from a moment when the anode side voltage "P−" which is greater than or equal to the predetermined detection voltage of over-current in the discharging direction is detected by the detector 21.

The anode side voltage "P−" is raised when the second FET 2 is switched on because of a voltage rise by the ON resistance of the second FET 2 while the discharging current for discharging the secondary battery 200 is flowing through the second FET 2. Further, when the first FET 1 is also switched on, the anode side voltage "P−" is further raised because of a voltage rise by the ON resistance of the first FET 1, while when the first FET 1 is switched off, the anode side voltage "P−" is further raised because of a voltage rise by the parasitic diode 1a of the first FET 1.

Figure 2:
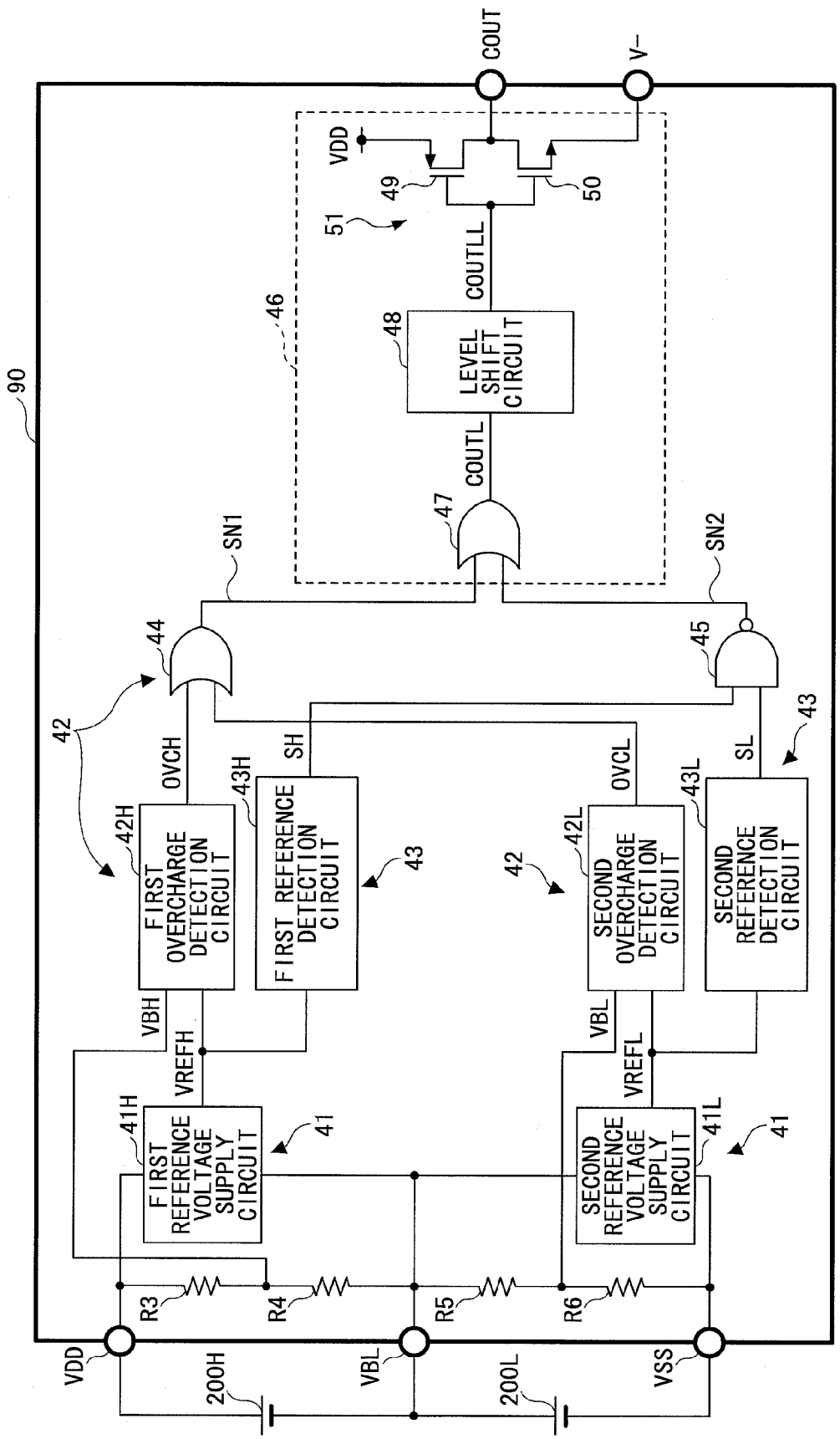
FIG. 2 is an example of a block diagram showing the structure of a protection IC in detail.

The structure of the protection IC 90 will be explained in detail. FIG. 2 is an example of a block diagram showing the structure of the protection IC 90. In this embodiment, the structure of the detector 21 and the charge control logic circuit 25 shown in FIG. 1 is further explained in detail.

The protection IC 90 includes a reference voltage supply circuit 41, a first detection circuit 42, a second detection circuit 43, and a control circuit 46. The first detection circuit 42 and the second detection circuit 43 correspond to a part of the detector 21 shown in FIG. 1. The control circuit 46 corresponds to a part of the charge control logic circuit 25 shown in FIG. 1.

The reference voltage supply circuit 41 outputs reference voltages corresponding to plural cells of the secondary battery 200, respectively. Each of the reference voltages is generated based on the cell voltage of the respective cell of the secondary battery 200.

In this embodiment, the reference voltage supply circuit 41 includes a first reference voltage supply circuit 41H and a second reference voltage supply circuit 41L.

The first reference voltage supply circuit 41H generates and outputs a constant first reference voltage VREFH based on the cell voltage (voltage between the anode and the cathode) of the first cell 200H. The second reference voltage supply circuit 41L generates and outputs a constant second reference voltage VREFL based on the cell voltage of the second cell 200L. The first reference voltage supply circuit 41H and the second reference voltage supply circuit 41L generate the constant reference voltages VREFH and VREFL by stepping down the respective cell voltages, respectively. The first reference voltage supply circuit 41H and the second reference voltage supply circuit 41L may be composed of transistors in which the gates are connected to the sources/drains, for example. The structure of the reference voltage supply circuit 41 will be explained later in detail.

The first detection circuit 42 outputs a signal prohibiting charging when the cell voltage of at least one of the plural cells of the secondary battery 200 exceeds a predetermined value that indicates an overcharge condition (hereinafter, simply referred to as a predetermined overcharge indication value), and outputs a signal permitting charging when the cell voltages of all of the plural cells of the secondary battery 200 do not exceed the predetermined overcharge indication value.

The predetermined overcharge indication value may be set to a value capable of detecting an overcharge condition. Therefore, the first detection circuit 42 is capable of detecting the overcharge condition of at least one of the cells of the secondary battery 200.

In this embodiment, as will be explained later, the predetermined overcharge indication value for the first cell 200H and the second cell 200L may be the first reference voltage VREFH and the second reference voltage VREFL, respectively.

In this embodiment, the first detection circuit 42 is composed of resistors R3 to R6, a first overcharge detection circuit 42H, a second overcharge detection circuit 42L and an OR circuit 44. The first detection circuit 42 is driven by the cell voltage (VDD-VSS) of the secondary battery 200 as a supply voltage. The resistors R3 to R6 are connected in a series between the VDD terminal and the VSS terminal in this order from the VDD terminal side. A connecting point between the resistor R4 and the resistor R5 is connected to the VBL terminal.

When the divided voltage VBH of the cell voltage of the first cell 200H divided by the resistors R3 and R4 exceeds the first reference voltage VREFH output from the first reference voltage supply circuit 41H (VBH>VREFH), it means that the first cell 200H is in the overcharge condition. Thus, the first overcharge detection circuit 42H outputs a signal prohibiting charging (high-level signal) as a signal OVCH. On the other hand, when the divided voltage VBH does not exceed the first reference voltage VREFH (VBH<=VREFH), it means that the first cell 200H is not in the overcharge condition. Thus, the first overcharge detection circuit 42H outputs a signal permitting charging (low-level signal) as the signal OVCH.

Similarly, the second overcharge detection circuit 42L outputs a signal prohibiting charging (high-level signal) as a signal OVCL, when the divided voltage VBL of the cell voltage of the second cell 200L divided by the resistors R5 and R6 exceeds the second reference voltage VREFL output from the second reference voltage supply circuit 41L (VBL>VREFL). On the other hand, the second overcharge detection circuit 42L outputs a signal permitting charging (low-level signal) as the signal OVCL, when the divided voltage VBL does not exceed the second reference voltage VREFL (VBL<=VREFL).

The OR circuit 44 outputs a logical sum of the signal OVCH from the first overcharge detection circuit 42H and the signal OVCL from the second overcharge detection circuit 42L.

With this structure, the OR circuit 44 outputs a signal prohibiting charging (high-level signal) as a signal SN1 when either of the signal OVCH or the signal OVCL is the signal prohibiting charging, and outputs a signal permitting charging (low-level signal) as the signal SN1 when both of the signal OVCH and the signal OVCL are the signal permitting charging.

The first reference voltage supply circuit 41H and the second reference voltage supply circuit 41L are configured to output the first reference voltage VREFH and the second reference voltage VREFL having predetermined target voltages that express the overcharging voltage compared with the divided voltage VBH and the divided voltage VBL, respectively.

The structure of the first detection circuit 42 will be explained in detail elsewhere within this specification.

The second detection circuit 43 outputs a signal prohibiting charging when at least one of the reference voltages, which are generated by the reference voltage supply circuit 41 based on the respective cell voltage of each of the plural cells of the secondary battery 200 is not within a predetermined target range. The second detection circuit 43, on the other hand, outputs a signal permitting charging when all of the reference voltages are within the predetermined target range.

The predetermined target range may be set to a value capable of detecting that the cell voltage of the respective cell is less than or equal to a voltage showing an over-discharge condition. Therefore, the second detection circuit 43 is capable of detecting a condition in which at least one of the cell voltages of the cells of the secondary battery 200 is not high enough to have the respective cell charged appropriately. The condition is simply referred to as an over-charging condition hereinafter.

In this embodiment, the second detection circuit 43 is composed of a first reference detection circuit 43H, a second reference detection circuit 43L, a NAND circuit 45 (NOT-AND gate). Further, although not shown in FIG. 1 or FIG. 2, the protection module circuit 80 of the embodiment includes a bias circuit 52 (see FIG. 5 to FIG. 7) for the operation of elements. The second detection circuit 43 uses outputs from the bias circuit 52 as will be explained later.

The second detection circuit 43 is driven by the cell voltage (VDD–VSS) of the secondary battery 200 as a supply voltage.

When the first reference voltage VREFH output from the first reference voltage supply circuit 41H is not within the predetermined target range, it means that the first reference voltage supply circuit 41H is in the over-discharge condition. Thus, the first reference detection circuit 43H outputs a signal prohibiting charging (low-level signal) as a signal SH. On the other hand, when the first reference voltage VREFH is within the predetermined target range, it means that the first reference voltage supply circuit 41H is not in the over-discharge condition. Thus, the first reference detection circuit 43H outputs a signal permitting charging (high-level signal) as the signal SH.

Similarly, the second reference detection circuit 43L outputs a signal prohibiting charging (low-level signal) as a signal SL when the second reference voltage VREFL is not within the predetermined target range. On the other hand, the second reference detection circuit 43L outputs a signal permitting charging (high-level signal) as the signal SL when the second reference voltage VREFL is within the predetermined target range.

The NAND circuit 45 outputs a negative AND operation result of the signal SH from the first reference detection circuit 43H and the signal SL from the second reference detection circuit 43L.

With this structure, the NAND circuit 45 outputs a signal prohibiting charging (high-level signal) as a signal SN2 when either of the signal SH or the signal SL is the signal prohibiting charging, and outputs a signal permitting charging (low-level signal) as the signal SN2 when both of the signal SH and the signal SL are the signal permitting charging.

As will be explained later in detail, the first reference detection circuit 43H and the second reference detection circuit 43L are configured to output the signal permitting charging as the signal SH and the signal SL when the first reference voltage VREFH and the second reference voltage VREFL are at the predetermined target voltages, which is the predetermined range, and output the signal prohibiting charging as the signal SH and the signal SL when the first reference voltage VREFH and the second reference voltage VREFL are not at the predetermined target voltages, respectively.

The structure of the second detection circuit 43 will be explained in detail elsewhere within this specification.

The control circuit 46 controls prohibition and permission of charging of the secondary battery 200 based on a logical sum of the output from the first detection circuit 42 and the output from the second detection circuit 43.

The control circuit 46 is composed of an OR circuit 47, a level shift circuit 48 and a CMOS inverter 51.

The OR circuit 47 outputs a logical sum of the output signal from the OR circuit 44 and the output signal from the NAND circuit 45 as a signal COUTL.

The level shift circuit 48 and the CMOS inverter 51 function as a driving circuit that drives the first FET 1 (see FIG. 1) based on the signal COUTL output from the OR circuit 47. The CMOS inverter 51 is composed of a P-channel MOSFET 49 and an N-channel MOSFET 50 respectively connected to the VDD terminal and V– terminal. The output from the CMOS inverter 51 is connected to the COUT terminal to be input to the gate of the first FET 1.

In this embodiment, the level shift circuit 48 may be driven by the cell voltage (VDD-V–) of the battery charger 400 as a supply voltage.

The level shift circuit 48 shifts the voltage of the signal COUTL for which the low-level signal is defined by a voltage at the VSS terminal and the high-level signal is defined by a voltage at the VDD terminal, to a logical signal COUTLL for which the low-level signal is defined by a voltage at the V-terminal and the high-level signal is defined by a voltage at the VDD terminal, without inverting the logical value.

When the logical signal COUTLL is a low-level signal, the P-channel MOSFET 49 is switched on so that a high-level signal is input to the gate of the first FET 1 to switch on the first FET 1 (charging is permitted at this time).

When, on the other hand, the logical signal COUTLL is a high-level signal, the N-channel MOSFET 50 is switched on so that a low-level signal is input to the gate of the first FET 1 to switch off the first FET 1 (charging is prohibited).

Therefore, according to the protection IC 90 including the reference voltage supply circuit 41, the first detection circuit 42, the second detection circuit 43 and the control circuit 46, charging of the secondary battery 200 can be appropriately prohibited in the overcharge condition and the over-discharge condition while having the device size of the protection IC 90 smaller. For example, as will be explained later, the gates of any transistors are not directly connected to the terminals VDD, VBL and VSS to which the first cell 200H and the second cell 200L are connected, electrostatic resistance becomes higher without enlarging the size of the device such as the gates or the like.

Further, as the prohibition and permission of discharging the secondary battery 200 is simply controlled based on the "logical sum" of the output from the first detection circuit 42 and the output from the second detection circuit 43, the driving circuit (such as the level shift circuit 48 and the CMOS inverter 51) for prohibiting charging can be used for the overcharge condition and the over-discharge condition to make the size of the device smaller.

Figure 9:
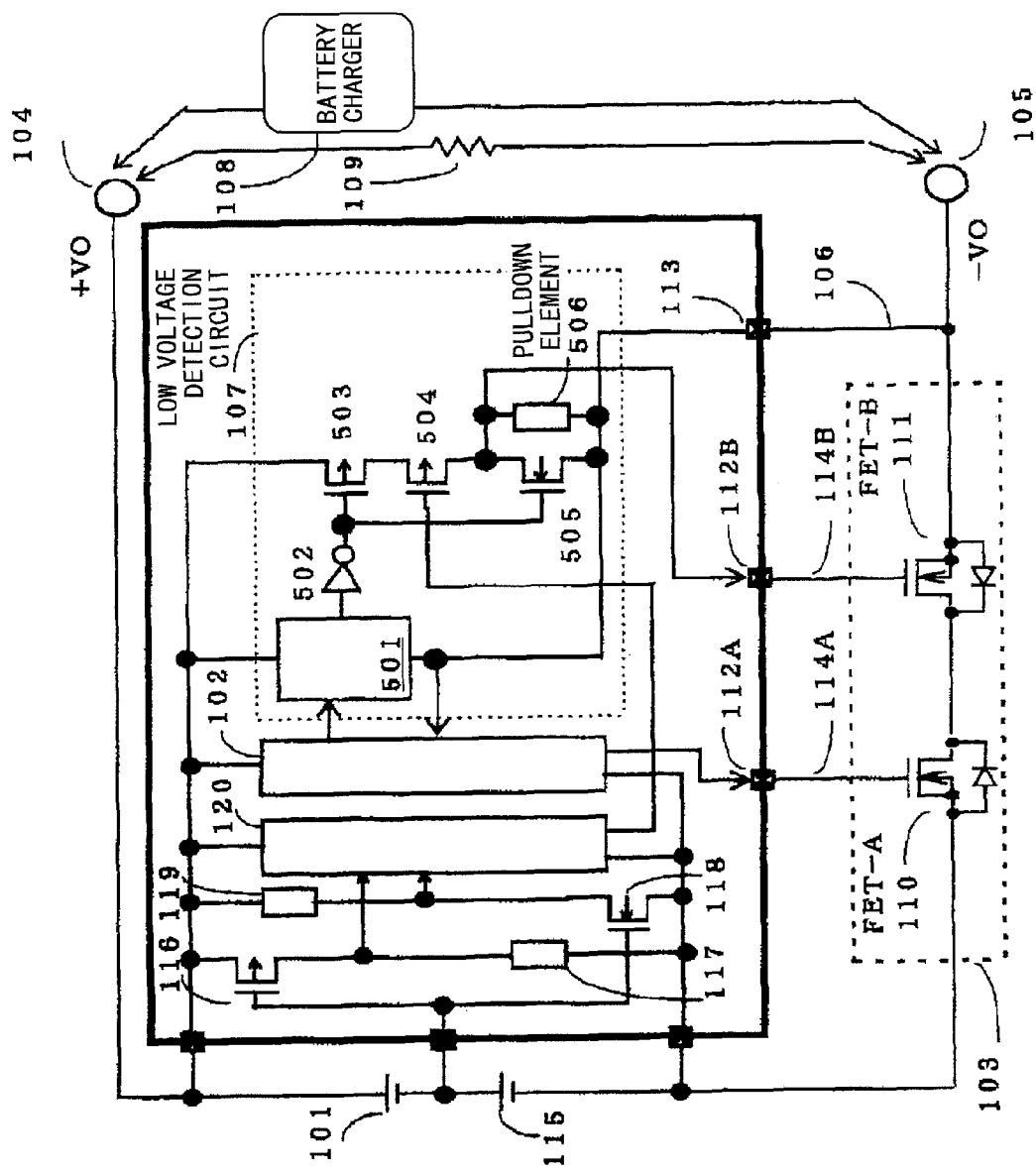
FIG. 9 is a block diagram of a power supply device disclosed in Patent Document.

For example, at least the P-channel MOS transistor 504 shown in FIG. 9 is not necessary for the protection IC 90 of the embodiment.

Further, the reference voltage supply circuit 41 may be structured by utilizing circuits which are originally included in a general protection IC, no additional circuits are required so that the size of the device can be maintained smaller.

FIG. 3 to FIG. 8 are detailed diagrams showing examples of the circuits shown in FIG. 2. The connection relationship between each of the elements such as a transistor, a resistor or the like are not explained in detail as this can be understood from the diagrams. Further, in this embodiment, some of the transistors may be a depletion type (normally on type) and others may be an enhancement type (normally off type). In the drawings, the transistor with a single gate line expresses the enhancement type and the transistor with two gate lines expresses the depletion type.

Figure 3:
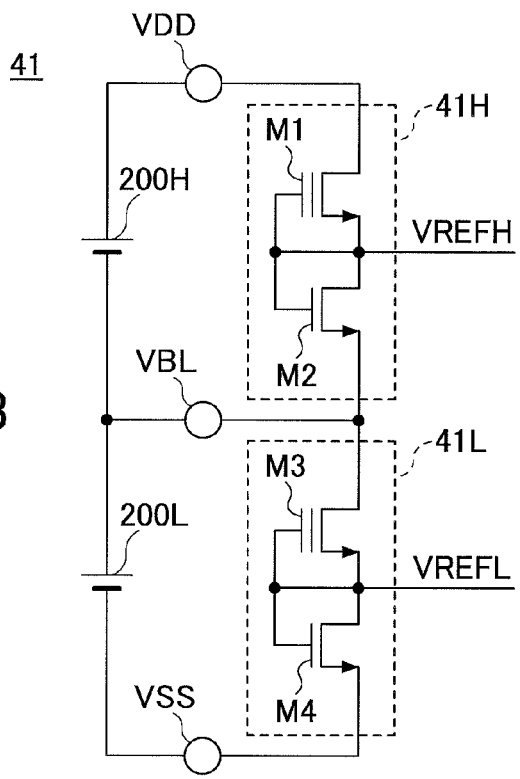
FIG. 3 is an example of a circuit diagram of a reference voltage supply circuit.

FIG. 3 is an example of a circuit diagram of the first reference voltage supply circuit 41H and the second reference voltage supply circuit 41L of the reference voltage supply circuit 41.

The first reference voltage supply circuit 41H includes a depletion type N-channel MOS transistor M1 and an enhancement type N-channel MOS transistor M2 where the gate and the source of the MOS transistor M1 and the gate and the drain of the MOS transistor M2 are commonly connected with each other. The drain of the MOS transistor M1 is connected to the VDD terminal and the source of the MOS transistor M2 is connected to the VBL terminal.

With this structure, at first, the MOS transistors M1 and M2 are both switched off and at this time, a current first flows through the depletion type MOS transistor M1 so that the first reference voltage VREFH becomes substantially equal to VDD. Then, when a voltage at a connecting point, between the source of the MOS transistor M1 and the drain of the MOS transistor M2, exceeds the threshold voltages of the MOS transistors M1 and M2, the MOS transistors M1 and M2 are switched on. At this time, the constant first reference voltage VREFH generated based on the cell voltage of the first cell 200H is output from the connecting point between the source of the MOS transistor M1 and the drain of the MOS transistor M2.

It means that when the cell voltage of the first cell 200H is low as less than or equal to an over-discharge voltage, the first reference voltage supply circuit 41H cannot output the constant targeted predetermined voltage.

The second reference voltage supply circuit 41L has a similar structure as that of the first reference voltage supply circuit 41H. The second reference voltage supply circuit 41L includes a depletion type N-channel MOS transistor M3 and an enhancement type N-channel MOS transistor M4.

When the cell voltage of the second cell 200L is within an appropriate range, the constant second reference voltage VREFL generated based on the cell voltage of the second cell 200L is output from a connecting point between the source of the MOS transistor M3 and the drain of the MOS transistor M4.

Similar to the first reference voltage supply circuit 41H, when the cell voltage of the second cell 200L is low as being less than or equal to an over-discharge voltage, the second reference voltage supply circuit 41L cannot output the constant targeted predetermined voltage.

Figure 4:
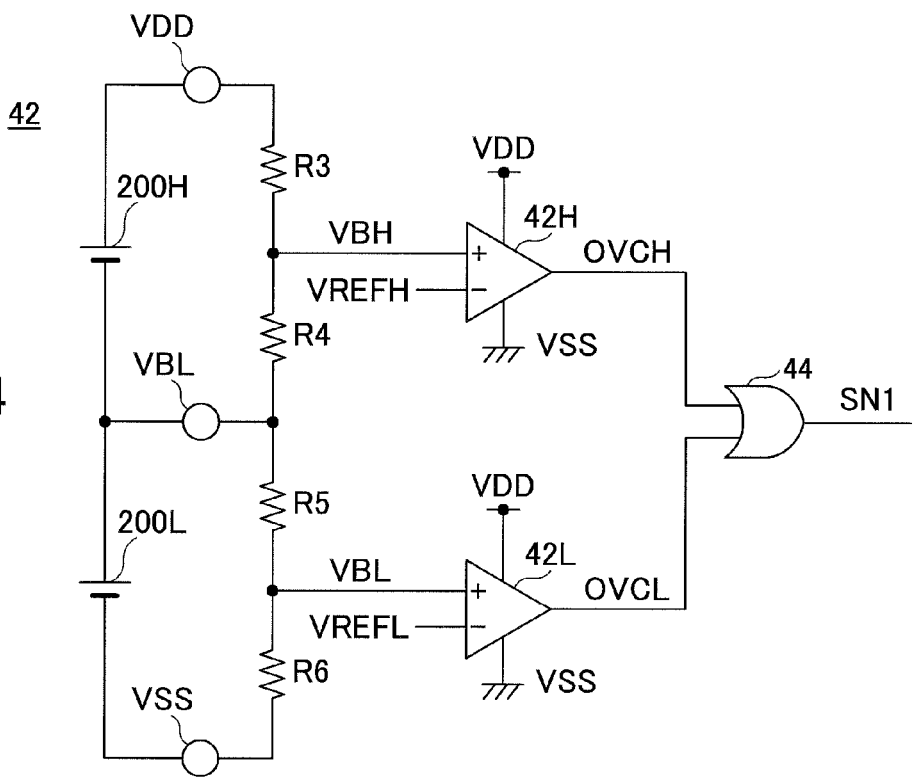
FIG. 4 is an example of a circuit diagram of a first detection circuit.

FIG. 4 is an example of a circuit diagram of the first overcharge detection circuit 42H and the second overcharge detection circuit 42L of the first detection circuit 42.

The first overcharge detection circuit 42H and the second overcharge detection circuit 42L are composed of comparators operated within a supply voltage VDD, which is an electric potential between the VSS terminal and the VDD terminal (which may be a potential ground).

For the first overcharge detection circuit 42H, the divided voltage VBH is input to a non-inverting input terminal (or a positive input terminal) and the first reference voltage VREFH output from the first reference voltage supply circuit 41H is input to an inverting input terminal (or a negative input terminal).

Similarly, for the second overcharge detection circuit 42L, the divided voltage VBL is input to a non-inverting input terminal (or a positive input terminal) and the second reference voltage VREFL output from the second reference voltage supply circuit 41L is input to an inverting input terminal (or a negative input terminal).

Therefore, with this structure, the first overcharge detection circuit 42H outputs the signal prohibiting charging (high-level signal) as the signal OVCH when the divided voltage VBH exceeds the first reference voltage VREFH (VBH>VREFH) and outputs the signal permitting charging (low-level signal) as the signal OVCH when the divided voltage VBH does not exceed the first reference voltage VREFH (VBH<=VREFH).

Similarly, the overcharge detection circuit 42L outputs the signal prohibiting charging (high-level signal) as the signal OVCL when the divided voltage VBL exceeds the second reference voltage VREFL (VBL>VREFL) and outputs the signal permitting charging (low-level signal) as the signal OVCL when the divided voltage VBL does not exceed the second reference voltage VREFL (VBL<=VREFL).

Figure 5:
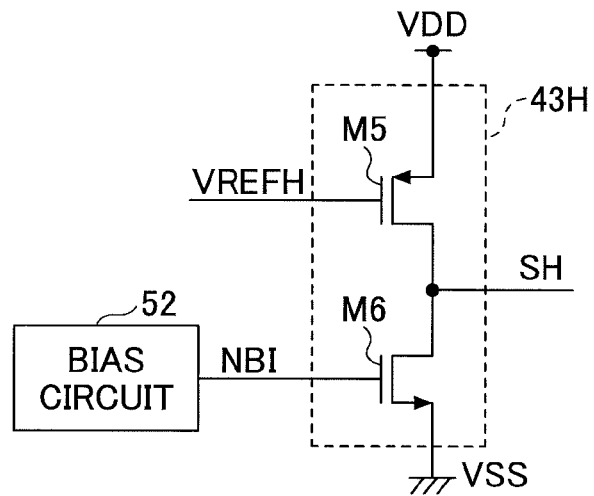
FIG. 5 is an example of a circuit diagram of a first reference detection circuit.

FIG. 5 is an example of a circuit diagram of the first reference detection circuit 43H of the second detection circuit 43.

The first reference detection circuit 43H includes a P-channel MOS transistor M5 and an N-channel MOS transistor M6. The first reference voltage VREFH is input to the gate of the P-channel MOS transistor M5. A bias voltage NBI generated by the bias circuit 52 is input to the gate of the N-channel MOS transistor M6.

Figure 7:
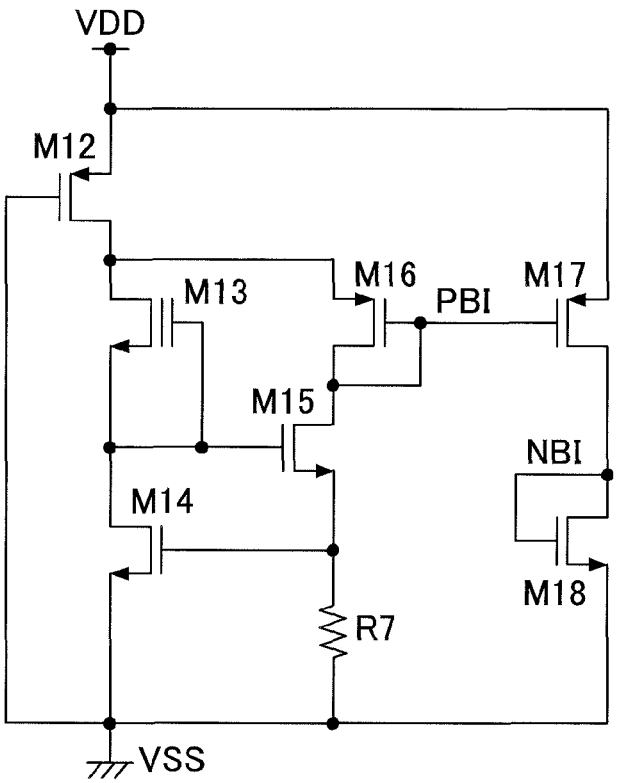
FIG. 7 is an example of a circuit diagram of a bias circuit included in a second detection circuit.

FIG. 7 is an example of a circuit diagram of the bias circuit 52.

The bias circuit 52 includes a P-channel MOS transistor M12, a depletion type N-channel MOS transistor M13, an N-channel MOS transistor M15, a current mirror (composed of P-channel MOS transistors M16 and M17), a limited current circuit (composed of a resistor R7 and an N-channel MOS transistor M14) and an N-channel MOS transistor M18.

When the voltage between the cathode of the first cell 200H and the anode of the second cell 200L of the secondary battery 200 exceeds the threshold voltage of the P-channel MOS transistor M12, the MOS transistor M12 is switched on. When the MOS transistor M12 is switched on, the current mirror (M16 and M17) is operated so that a constant forward direction voltage, which is the bias voltage NBI, is generated at the drain and the gate, which are connected with each other, of the MOS transistor M18.

When the supply voltage VDD becomes greater so that the voltage between ends of the resistor R7 exceeds the threshold voltage of the MOS transistor M14, the limited current circuit (R7 and M14) is operated to switch off the MOS transistor M15. With this, the operation of the current mirror (M16 and M17) is terminated so that the bias voltage NBI becomes 0V.

Referring back to FIG. 5, when the cell voltage of the first cell 200H is less than or equal to the over-discharge condition, the first reference voltage VREFH is not at the constant predetermined target voltage for the first reference voltage VREFH but is as high as VDD. Therefore, the MOS transistor M5 is not switched on. At this time, the bias voltage NBI output from the bias circuit 52 is the constant forward direction voltage so that the MOS transistor M6 is switched on by the bias voltage NBI. Therefore, the first reference detection circuit 43H outputs the signal prohibiting charging (low-level signal) as the signal SH.

When, on the other hand, the cell voltage of the first cell 200H is at a normal voltage higher than in the over-discharge condition, the first reference voltage VREFH becomes the predetermined target value so that the MOS transistor M5 is switched on, while the bias voltage NBI becomes 0V, which is less than the threshold voltage of the MOS transistor M6, so that the MOS transistor M6 is switched off. Therefore, the first reference detection circuit 43H outputs the signal permitting charging (high-level signal) as the signal SH.

The targeted value for the first reference voltage VREFH may be set lower than a value obtained by subtracting the threshold voltage of the transistor M5 from the supply voltage VDD.

Figure 6:
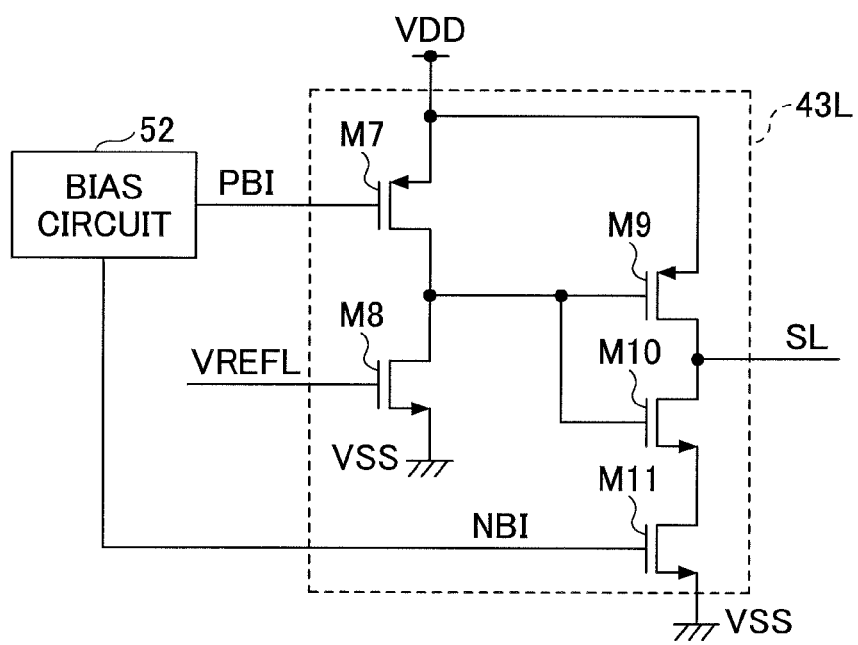
FIG. 6 is an example of a circuit diagram of a second reference detection circuit.

FIG. 6 is an example of a circuit diagram of the second reference detection circuit 43L.

The second reference detection circuit 43L includes a P-channel MOS transistor M7, an N-channel MOS transistor M8, a P-channel MOS transistor M9, an N-channel MOS transistor M10 and an N-channel MOS transistor M10. The bias voltage PBI, which is a voltage at the gates of the MOS transistors M16 and M17 of the bias circuit 52, is input to the gate of the MOS transistor M7. The outputs from the MOS transistors M7 and M8 are input to the gates of the MOS transistors M9 and M10. The second reference voltage VREFL is input to the gate of the MOS transistor M8. The bias voltage NBI is input to the gate of the MOS transistor M11.

When the cell voltage of the second cell 200L is less than or equal to the over-discharge condition, the second reference voltage VREFL is not at the predetermined target voltage for the first reference voltage VREFH but is as low as VSS. Therefore, the MOS transistor M8 is not switched on. At this time, the MOS transistor M11 is switched on by the bias voltage NBI, and the MOS transistor M7 is switched on by the bias voltage PBI so that the MOS transistor M10 is switched on. Therefore, the second reference detection circuit 43L outputs the signal prohibiting charging (low-level signal) as the signal SL.

When, on the other hand, the cell voltage of the second cell 200L becomes a normal voltage higher than that in the over-discharge condition, the second reference voltage VREFL becomes the predetermined target value, while the bias voltage NBI becomes less than the threshold voltage of the transistor M11. Further, the electronic potential difference (VDD-PBI) becomes less than a threshold voltage of the MOS transistor M7 so that the MOS transistor M7 is switched off. Therefore, the MOS transistor M8 is switched on so that the MOS transistor M9 is switched on while the MOS transistor M10 and the MOS transistor M11 are switched off. Therefore, the second reference detection circuit 43L outputs the signal permitting charging (high-level signal) as the signal SL.

Figure 8:
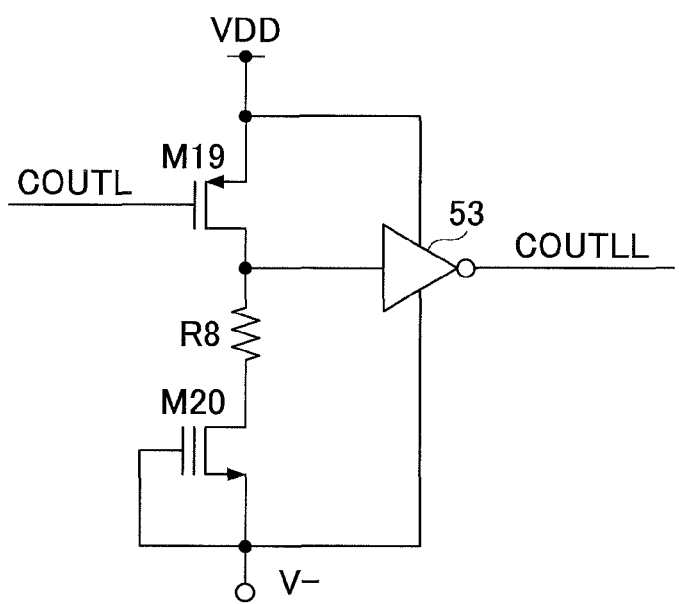
FIG. 8 is an example of a circuit diagram of a level shift circuit.

FIG. 8 is an example of a circuit diagram of the level shift circuit 48.

The level shift circuit 48 includes an enhancement type P-channel MOS transistor M19, a depletion type N-channel MOS transistor M20, a resistor R8 and an inverter 53.

When the signal COUTL input to the gate of the transistor M19 is a low-level signal, the logical signal COUTLL output from the inverter 53 becomes a low-level (charging permitted), and when the signal COUTL is a high-level signal, the logical signal COUTLL becomes a high-level (charging prohibited).

When the voltage of the secondary battery 200 (VDD-VSS) becomes less than an operating voltage, which may be determined by the threshold voltages of the MOS transistors, outputs from the circuits to which the power of the secondary battery 200 is provided to be operated (the OR circuits 44 and 47, the NAND circuit 45 and the like) become indefinite values with respect to the voltage (VDD-VSS).

Even at this time, as the level shift circuit 48 is driven by the voltage (VDD-V−) of the battery charger 400 (see FIG. 1), the level shift circuit 48 can function with respect to the voltage (VDD-V−). When the indefinite value is input to the gate of the MOS transistor M19 as the signal COUTL, the MOS transistor M19 is not switched on so that a low-level signal is input to the inverter 53. Thus, the inverter 53 outputs a high-level signal (charging prohibited) as the logical signal COUTLL. Therefore, even when the voltage of the secondary battery voltage (VDD-VSS) becomes less than the operating voltage, charging is continued to be prohibited.

The present invention is not limited to the specifically disclosed embodiments, and variations and modifications may be made without departing from the scope of the present invention.

For example, the secondary battery 200 may include three or more cells connected in a series. Further, for example, the positions of the first FET 1 and the second FET 2 may be changed.

The present application is based on Japanese Priority Application No. 2011-83164 filed on Apr. 4, 2011, the entire contents of which are hereby incorporated herein by reference.

What is claimed is:

1. A battery protection circuit for protecting a secondary battery composed of a first cell and a second cell, comprising:
a reference voltage supply circuit that outputs a first reference voltage and a second reference voltage generated based on a cell voltage of the first cell and a cell voltage of the second cell, respectively;
a first detection circuit that outputs a signal prohibiting charging when at least one of the cell voltages of the first cell and the second cell exceeds a predetermined overcharge indication value indicating an overcharge condition, and outputs a signal permitting charging when none of the cell voltages of the first cell and the second cell exceed the predetermined overcharge indication value;
a second detection circuit that outputs a signal prohibiting charging when at least one of the first reference voltage and the second reference voltage is not within a predetermined target range, and outputs a signal permitting charging when all of the first reference voltage and the second reference voltage are within the predetermined target range; and a control circuit that controls a switch for allowing a flow of a charging current to the secondary battery based on the output from the first detection circuit and the second detection circuit such that charging of the secondary battery is prohibited when at least one of the outputs from the first detection circuit and the second detection circuit is the signal prohibiting charging, and charging of the secondary battery is permitted when all of the outputs from the first detection circuit and the second detection circuit are the signal permitting charging.

2. The battery protection circuit according to claim 1, wherein the signal prohibiting charging is a high-level signal and the signal permitting charging is a low-level signal, and the control circuit includes
an OR circuit that outputs a logical sum of the outputs from the first detection circuit and the second detection circuit, and
a driving circuit that controls the switch for allowing the flow of a charging current to the secondary battery based on the logical sum.

3. The battery protection circuit according to claim 2, wherein the driving circuit includes
a level shift circuit configured to level-shift the value of the logical sum and output a logical signal that controls the switch to shut off the flow of the charging current to the secondary battery when the voltage of the secondary battery is less than a predetermined operating voltage.

4. The battery protection circuit according to claim 1, wherein the reference voltage supply circuit includes
a first reference voltage supply circuit for outputting the first reference voltage composed of a depletion type N-channel MOSFET and an enhancement type N-channel MOSFET, and
a second reference voltage supply circuit for outputting the second reference voltage composed of a depletion type N-channel MOSFET and an enhancement type N-channel MOSFET.

5. The battery protection circuit according to claim 4, wherein in the first reference voltage supply circuit, the depletion type N-channel MOSFET and the enhancement type N-channel MOSFET are connected in a series such that the drain of the depletion type N-channel MOSFET is connected to the cathode of the first cell, the source of the enhancement type N-channel MOSFET is connected to the anode of the first cell, the source and the gate of the depletion type N-channel MOSFET and the drain and the gate of the enhancement type N-channel MOSFET are connected with each other, and a voltage at the source and the gate of the depletion type N-channel MOSFET and the drain and the gate of the enhancement type N-channel MOSFET is output as the first reference voltage, and in the second reference voltage supply circuit, the depletion type N-channel MOSFET and the enhancement type N-channel MOSFET are connected in a series such that the drain of the depletion type N-channel MOSFET is connected to the cathode of the second cell, the source of the enhancement type N-channel MOSFET is connected to the anode of the second cell, the source and the gate of the depletion type N-channel MOSFET and the drain and the gate of the enhancement type N-channel MOSFET are connected with each other, and a voltage at the source and the gate of the depletion type N-channel MOSFET and the drain and the gate of the enhancement type N-channel MOSFET is output as the second reference voltage.

6. The battery protection circuit according to claim 1, wherein the first detection circuit uses the first reference voltage and the second reference voltage as the predetermined overcharge indication value, outputs the signal prohibiting charging when at least one of the cell voltages of the first cell and the second cell exceeds the first reference voltage and the second reference voltage, respectively, and outputs the signal permitting charging when none of the cell voltages of the first cell and the second cell exceed the first reference voltage and the second reference voltage, respectively.

7. The battery protection circuit according to claim 6, wherein the first detection circuit includes
a first comparator that compares the cell voltage of the first cell and the first reference voltage and outputs a signal prohibiting charging when the cell voltage of the first cell exceeds the first reference voltage,
a second comparator that compares the cell voltage of the second cell and the second reference voltage and outputs a signal prohibiting charging when the cell voltage of the second cell exceeds the second reference voltage, and
a logical circuit that outputs the signal prohibiting charging when at least one of the first comparator and the second comparator outputs the signal prohibiting charging, and outputs the signal permitting charging when all of the first comparator and the second comparator output the signal permitting charging, to the control circuit.

8. The battery protection circuit according to claim 1, wherein the reference voltage supply circuit is configured to output the first reference voltage and the second reference voltage within the predetermined target range when the cell voltages of the first cell and the second cell are greater than or equal to a predetermined value, respectively.

9. A battery protection device for protecting a secondary battery composed of a first cell and a second cell, comprising:
a reference voltage supply circuit that outputs a first reference voltage and a second reference voltage generated based on a cell voltage of the first cell and a cell voltage of the second cell, respectively;
a first detection circuit that outputs a signal prohibiting charging when at least one of the cell voltages of the first cell and the second cell exceeds a predetermined overcharge indication value indicating an overcharge condition, and outputs a signal permitting charging when none of the cell voltages of the first cell and the second cell exceeds the predetermined overcharge indication value;
a second detection circuit that outputs a signal prohibiting charging when at least one of the first reference voltage and the second reference voltage is not within a predetermined target range, and outputs a signal permitting charging when all of the first reference voltage and the second reference voltage are within the predetermined target range;
a switch for allowing a flow of a charging current to the secondary battery; and
a control circuit that controls the switch to shut off the flow of the charging current to the secondary battery to prohibit charging of the secondary battery when at least one of the outputs from the first detection circuit and the second detection circuit is the signal prohibiting charging, and controls the switch to allow the flow of the charging current to the secondary battery to permit charging of the secondary battery when all of the outputs from the first detection circuit and the second detection circuit are the signal permitting charging.

10. A battery pack, comprising:
the battery protection device and
the secondary battery according to claim 9.

* * * * *